United States Patent [19]
Volker

[11] Patent Number: 4,768,356
[45] Date of Patent: Sep. 6, 1988

[54] ARRANGEMENT FOR THE TRANSPORT OF A CRYOGENIC REFRIGERANT TO THE WORK AREA OF A ROBOT

[75] Inventor: Wolfgang Volker, Tonisvorst, Fed. Rep. of Germany

[73] Assignee: Messer. Griesheim GmbH, Fed. Rep. of Germany

[21] Appl. No.: 55,327

[22] Filed: May 29, 1987

[30] Foreign Application Priority Data

Jul. 11, 1986 [DE] Fed. Rep. of Germany ....... 3623420

[51] Int. Cl.⁴ ............................................ F25B 19/00
[52] U.S. Cl. ........................................ 62/514 R; 62/55
[58] Field of Search ............................. 62/514 R, 55

[56] References Cited

U.S. PATENT DOCUMENTS

| | | | |
|---|---|---|---|
| 3,386,256 | 6/1968 | Alexander | 62/55 |
| 3,972,202 | 8/1976 | Stearns | 62/514 R |
| 3,994,673 | 11/1976 | Bixby | 62/55 |
| 4,175,395 | 11/1979 | Prost et al. | 62/55 |
| 4,492,089 | 1/1985 | Rohner et al. | 62/55 |
| 4,566,283 | 1/1986 | Boese | 62/514 R |

*Primary Examiner*—Ronald C. Capossela
*Attorney, Agent, or Firm*—Connolly & Hutz

[57] ABSTRACT

An arrangement for transporting cryogenic refrigerant to a work area includes a robot with a phase-separator and an insulated flexible hose between the phase-separator and the work area. The phase generator is mounted above the work area. The hose is a coaxial hose in which the inner hose and an annulus created by the inner hose and an outer hose at the opening of the phase-separator are connected during the liquid phase.

5 Claims, 2 Drawing Sheets

ARRANGEMENT FOR THE TRANSPORT OF A CRYOGENIC REFRIGERANT TO THE WORK AREA OF A ROBOT

BACKGROUND OF THE INVENTION

Robots are fast, automatic machines which can be equipped with various tools. The fundamental advantage of such processing equipment is its great flexibility. But this can only be achieved if tools can be mounted, which guarantee high processing speeds. Otherwise, a processing station equipped with robots is too slow when compared with a conventional solution; or, if many robots are operated at once, it is not profitable. The trend is therefore toward very fast robots with correspondingly fast tools. This is very demanding of the tools with respect to endurance and thermal capacity. An example serves to illustrate: to cast a motor vehicle radiator, a very complexly molded part, either an expensive press tool or a less costly robot can be used. Due to the slow working speed of the robot that solution is not economical. Since, on the other hand, the amortization time of the expensive press tool is too long, such parts are debured by expensive manual labor.

The processing speed of the robot can be increased, if the area to be worked is cooled. This is particularly valid for devices for grinding, milling, drilling, and polishing. A quick and intensive cooling can be achieved with cryogenic refrigerants, for example with liquid nitrogen. Due to the finite thermal conductivity of the materials to be processed, a lead time for the cooling of the area to be processed is to be strived for. Simultaneous cooling and processing would not allow the processing speed to increase to the maximum possible. There exist definite relationships between the penetration depth of the cold front, the rate of feed of the tool and the distance between the cooling zone and the work zone, which can be determined though testing. Therefore, an exact proportioning and delay-free admission with the refrigerant is an imperative condition for the optimal use of a robot whose work area is to be cooled with a cryogenic refrigerant. In addition, the refrigerant must be transported to the constantly moving robot joint with as little loss as possible.

Considerable practical difficulties oppose the desirable use of a cryogenic refrigerant, particularly liquid nitrogen. In order to avoid unwanted gas blockages in the transport conduit to the processing point of the robot-arm, the flexible conduit must be well insulated. An effective insulation, for example a double-walled corrugated hose with multiple-layer vacuum insulation or a hose insulated with mineral materials, would, however, be so inflexible that it could either not be installed on the robot at all, or its endurance would be insufficient. The demands for optimal insulation and higher flexibility as well as greater endurance are therefore in conflict.

SUMMARY OF INVENTION

An object of the invention is to provide an arrangement for the transport of a cryogenic refrigerant to the work area of a robot, whose insulation reliably eliminates the formation of gas bubbles in the transport conduit on the one hand, and which is also so flexible, that greater endurance can be expected.

The development of gas bubbles and therefore gas blockages in the transport conduit to the work station substantially avoided in that the phase separator is set above the robot, and that the hose for the transport of the cryogenic refrigerant runs vertically or diagonally down to the work area. While the liquid in the phase separator is generally in a boiling state evaporates partially due to heating the liquid in the hose is under a greater hydrostatic pressure. This liquid is then supercooled and can absorb heat without immediately evaporating. With the use of a high-quality insulation, this would suffice to prevent the formation of gas bubbles in normal use. Because of the desired flexibility, the hose would be just sufficiently insulated against this. A certain incidence of heat would be taken into consideration. Since the hose is described, in terms of the invention, as a coaxial hose, in which the inner hose as well as the annulus are filled with liquid, the incoming heat only causes gas bubbles in the annulus, from which no liquid transported to the work area. Here the gas bubbles can rise harmlessly into the phase separator. Since the inner hose also insulates slightly, the liquid in the inner hose remains supercooled and the refrigerant can be dosed exactly for the nozzle and admission pressure. It is mainly due to this, such is the hose to be regulated, that exactly sufficient liquid refrigerant can flow out to the valve. In addition to strong enough wall material must be chosen for the inner hose, that the interior space and the annulus are sufficiently insulated from each other.

Therefore, the design of the invention, a certain flow of heat into the hose is taken into consideration from the start. The insulation can thus be so easily chosen, that the hose remains sufficiently flexible on the one hand, and at the same time the outer surface of the hose cannot be supercooled.

THE DRAWINGS

FIG. 1 schematically illustrates an entire arrangement with refrigerant storage, phase separator, robot and process control computer; and FIG. 2 shows in cross-section the phase separator and hose conduit in detail.

DETAILED DESCRIPTION

Figure 1:
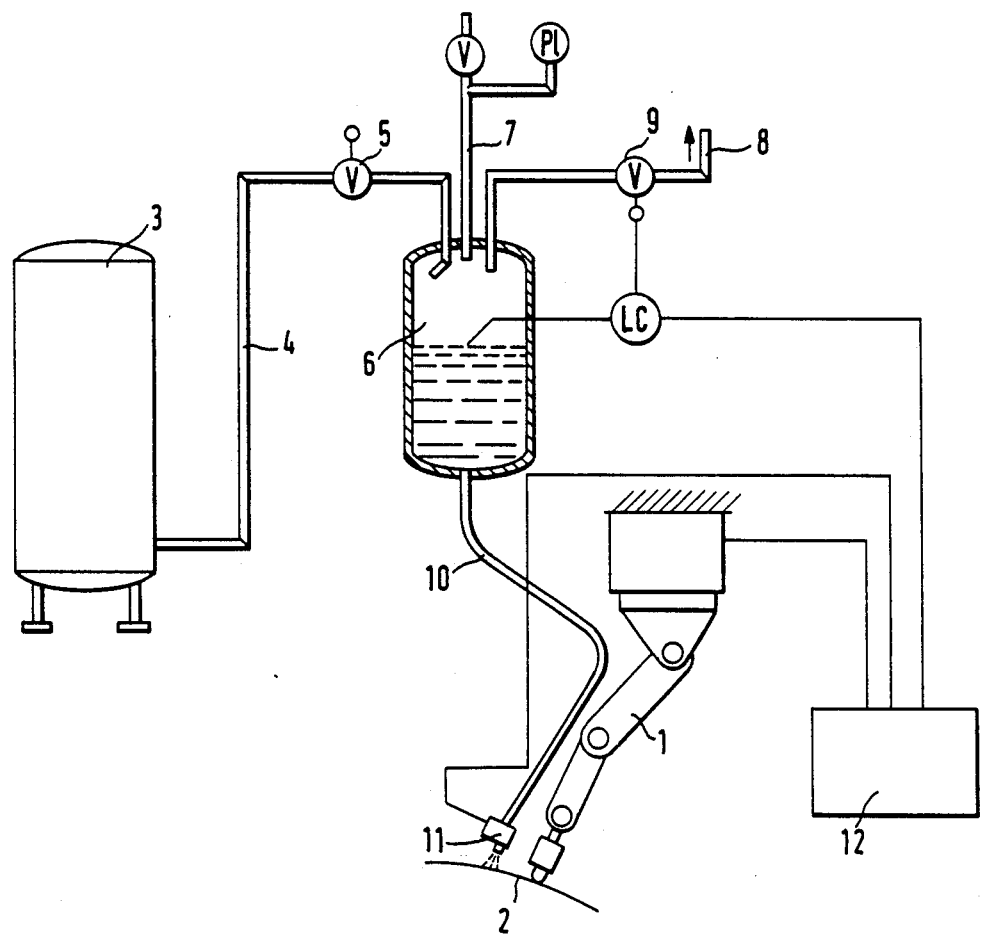

The arrangement presented in FIG. 1 shows a robot 1, whose work area 2 is cooled by liquid nitrogen as a refrigerant. The liquid nitrogen is drawn from tank 3 and directed through the conduit 4 and the valve 5 into the phase separator 6. The phase separator 6 has a safety arrangement 7. In the phase separator 6 the excess gas is separated and removed through conduit 8 and valve 9. The liquid phase reaches the work area 2 through the hose 10 and the nozzle 11. The transport of the nitrogen into the phase separator and to the work area is controlled by the process control computer 12, which is indicated by the un-numbered conduits.

Figure 2:
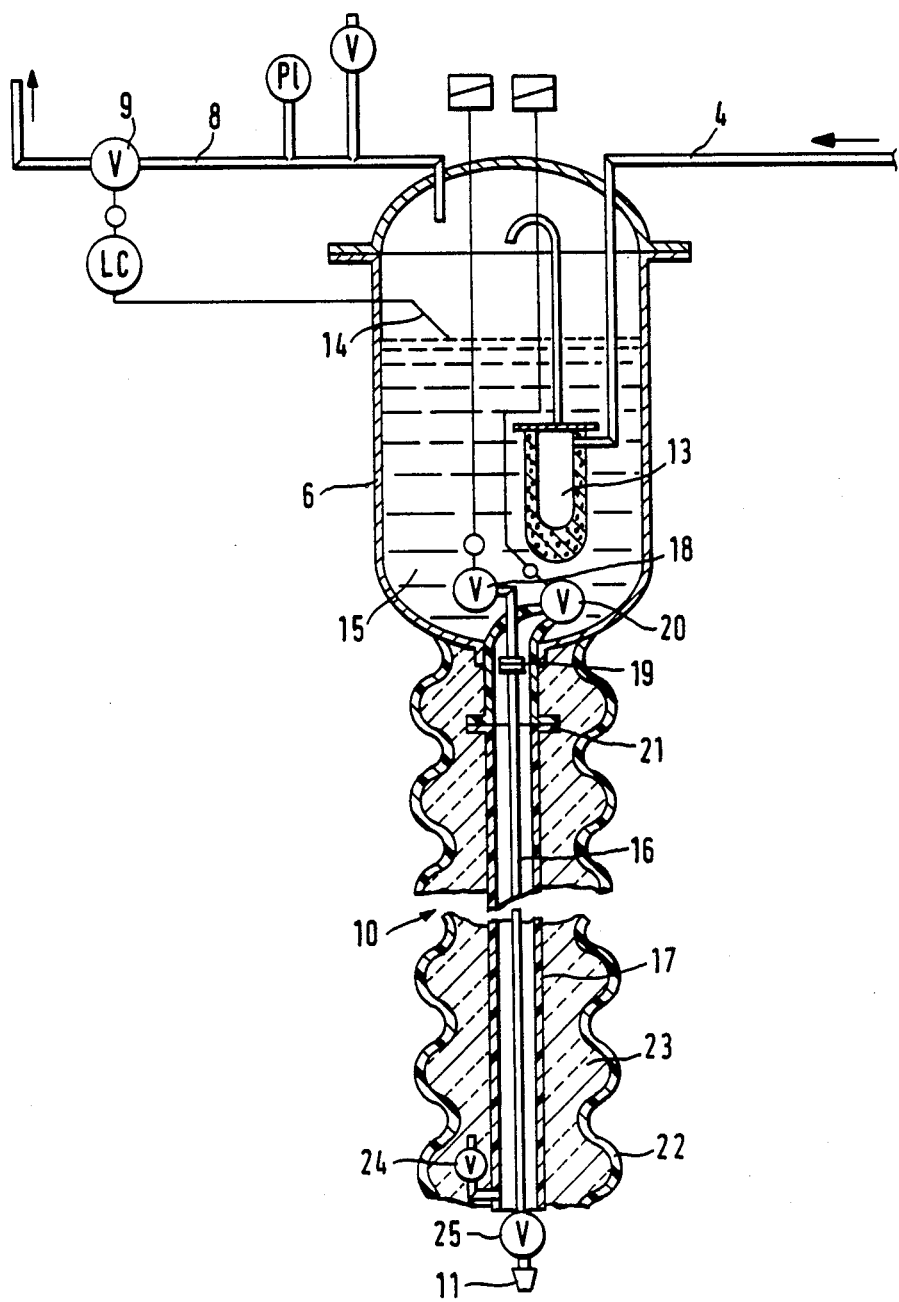

FIG. 2 presents the phase separator 6 and the hose 10 in detail. The liquid nitrogen in conduit 4 reaches the phase separator through a fine filter 13. The height of the liquid nitrogen 15 in the phase separator 6 is determined by the level controller 14.

According to the invention hose 10 is described as a coaxial hose, in which the inner hose 16 as well as the annulus create between the inner hose 16 and the outer hose 17 are connected to the liquid nitrogen 15 in the phase separator 6. The nitrogen, used for cooling, reaches the joint 19 and the inner hose 16 to the nozzle 11 through the valve 18. Liquid nitrogen reaches the space between the inner hose 16 and the outer hose 17 through valve 20 and fills the entire annulus. Valves 18 and 20 are opened in normal use. Gas bubbles formed in the annulus can therefore ascend, collect in the phase separator 6 and from there be removed. Valves 18 and 20, with the aid of joints 19 and 21, also make it possible to exchange hose 10 when the phase separator is full.

The outer hose 17 is surrounded by a protective hose 22 and insulation 23. The protective hose 22 serves only as an almost gastight closing of the system and as a mechanical protection for the insulation 23. Only a slight leakage is allowed due to construction. Low temperature stability is therefore unnecessary. The heat flow through the insulation 23, caused by the construction, is so great, that the outer surfaces of the outer hose 17 cannot become supercooled, which would lead to the condensation of air. For safety reasons the insulation 23 is also rinsed with nitrogen via a fitting shown as valve 24.

The liquid nitrogen is transported to the nozzle 11 through the valve 25. This must withstand significant mechanical strain. In order to insure the immediate flow of liquid nitrogen upon release of the valve seat, the valve 25 must be mounted at the inner hose 16 such that the liquid nitrogen reaches the valve seat. The nozzle 11 must have a great thermal mass, so that the nozzle bore does not heat up during the short pauses, which could lead to gas blockages in the nozzle bore.

In the working example portrayed in FIGS. 1 and 2 the inner hose 16 is made of polyamide and has a diameter of 6 and 4 mm. The outer hose 17 is a wrapped polyamide hose made from fabric with special steel spring insert. This hose is highly flexible, compression-proof and liquid-tight. The inner diameter of the outer hose is 10 to 12 mm. Concentric coaxial hoses made of polyester felt are used for the insulation 23. The protective hose 22 is a highly flexible polyethylene corrigated tube. It serves only as a gastight closing of the system and as a mechanical protection of the insulation 23. Generally, all cold-resistant hose materials are suitable, particularly PTFE, PE, PP, PA and aramide.

SUMMARY OF THE INVENTION

If robots are quipped with tools for high processing speeds, particularly for machining, the processing speed may be increased by the intensive cooling of the work area with a cryogenic refrigerant such as liquid nitrogen. The hose 10 for the transport of the refrigerant cannot be optimally insulated, because it would become too inflexible. The danger exists, that the refrigerant may vaporize in the hose and the gas bubbles may interfere with the transport of the refrigerant.

This is prevented, in that a phase-separator 6 is mounted above the work area, whose opening for the liquid phase is attached to a coaxial hose, through which the refrigerant agent reaches the work area. The inner hose 16 as well as the annulus between the inner hose and the outer hose 17 are open to the refrigerant.

What is claimed is:

1. In an arrangement for the transport of a cryogenic refrigerant to the work area of a robot with a phase-separator and an insulated, flexible hose placed between the phase-separator and the work area, the improvement being in that said phase-separator is mounted above the work area, said hose extending generally vertically down between said hose having an outlet at the work area for discharging the phase-separator and the work area in all work positions, and said hose being a coaxial hose in which the inner hose and the annulus created by the outer hose and said inner hose at the opening of said phase-separator are connected during the liquid phase.

2. Arrangement according to claim 1, thereby characterized in that said inner hose is made of polyamide and said outer hose is formed as a wrapped polyamide hose made from fabric with special steel spring insert.

3. Arrangement according to claim 1, thereby characterized in that said generally vertically disposed hose is diagonally disposed.

4. Arrangement according to claim 1, thereby characterized in that said generally vertically disposed hose is vertically disposed.

5. Arrangement according to claim 1, thereby characterized in that said outer hose is coxially within a protective hose with insulation material filling the space between said outer hose and said protective hose.

* * * * *